(12) United States Patent
Clark et al.

(10) Patent No.: US 6,677,571 B1
(45) Date of Patent: Jan. 13, 2004

(54) ROCKET LAUNCH DETECTION PROCESS

(75) Inventors: Frank O. Clark, Dunstable, MA (US);
Vincent J. Falcone, Jr., Needham, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 5 days.

(21) Appl. No.: 09/842,023

(22) Filed: Apr. 26, 2001

(51) Int. Cl.$^7$ .............................. H01L 31/00; G01J 5/02
(52) U.S. Cl. .................................. 250/214.1; 250/342
(58) Field of Search .............................. 250/214.1, 340, 250/342; 244/3.14, 3.19; 342/195, 196, 351; 382/103

(56) References Cited

U.S. PATENT DOCUMENTS

| | | | | |
|---|---|---|---|---|
| 5,430,448 A | * | 7/1995 | Bushman | 342/52 |
| 5,464,174 A | * | 11/1995 | Laures | 244/3.11 |
| 5,568,151 A | * | 10/1996 | Merritt | 342/192 |
| 5,805,106 A | * | 9/1998 | Baum | 342/159 |
| 5,999,652 A | * | 12/1999 | Bushman | 382/221 |
| 6,374,192 B1 | * | 4/2002 | Brogle et al. | 702/107 |
| 6,398,155 B1 | * | 6/2002 | Hepner et al. | 244/3.15 |
| 6,421,116 B1 | * | 7/2002 | Schilli et al. | 356/28 |

* cited by examiner

*Primary Examiner*—Huy Mai
(74) *Attorney, Agent, or Firm*—William G. Auton

(57) ABSTRACT

A technique is disclosed for identifying a missile in flight. This process comprises the steps of: rapidly sampling radiometric detection signals of a source to collect power spectral density (PSD) characteristics that include the source's continuum in PSD space and PSD frequency; and identifying the source as a missile when the continuum in PSD space decreases as PSD frequency increases.

1 Claim, 5 Drawing Sheets

ROCKET LAUNCH DETECTION PROCESS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radiometry and more specifically to a rocket launch detection process that correlates specific power spectral density (PSD) characteristics with a tabulation of known missile plume signatures while reducing background clutter in two orders of magnitude in sources of high intrinsic radiance and turbulence.

Space-based early warning systems are being developed to provide early warning of ballistic missile launches by detecting and tracking the hot exhaust plumes of the missiles using infrared sensors. These early warning systems will require multitarget tracking systems that are able to process infrared sensor data and provide accurate detection and tracking of closely spaced objects in a dense multitarget environment. Closely spaced objects are targets whose focal-plane image centers fall within a small number of pixels of each other, and are particularly difficult to accurately detect and track because of the difficulty of associating new observations to existing target tracks in a multitrack environment.

Multitarget tracking systems presently under consideration for use in these space-based early warning systems either cannot accurately associate and track closely spaced objects or require an excessive amount of computer memory and processing time. Multiple hypotheses tracking, an example of the latter, is theoretically the best approach for multitarget tracking.

This invention relates generally to missile surveillance systems over a wide range of the electromagnetic spectrum and, more particularly, to the visible, infrared and microwave spectral regions.

Any battlefield, as observed by an IR sensor or by a radiometer, is characterized by patterns of radiance that include both target radiance and background radiance. The features of the background patterns which are associated with the physical structure of the ground surface, background sky and intervening atmosphere are termed clutter. Other features are deterministic consequences of the limitations of the measurement and data recording systems, including distortions associated with the optical and imagining systems. In addition, there are features which are non-deterministic consequences of the randomness associated with the operation of the sensors and data recording systems (noise).

The radiance scene of the ambient background patterns interferes with the surveillance of "targets" which locally modulate the radiance by other mechanisms. These surveillance targets can be small or distant rockets, vehicles, objects or patterns associated with localized thermal disturbances produced by moving surfaced or flying vehicles.

Generally, there are two types of radiometric imagining instruments for radiometric surveillance: passive radiometric imaging systems and active radiometric imaging systems. Passive radiometric imaging systems are inherently simpler and less costly than active systems such as radar or lidar. A disadvantage of existing passive systems however is their limited utility for some parts of the spectrum due to insufficient signal/clutter ratio. Further, the signal/clutter ratio is much smaller than the ratio, which can be obtained from corresponding radar systems.

The task of reducing the background clutter in the detection of missile launches by the power spectral density signatures characteristic of their rocket plumes is alleviated, to some extent, by the systems disclosed in the following U.S. Patents, the disclosures of which are incorporated herein by reference:

U.S. Pat. No. 4,081,679 entitled Dual Channel Correlation Radiometer by Cohn;

U.S. Pat. No. 5,805,106 entitled Dual Polarization Wave Clutter Reduction by Baum;

U.S. Pat. No. 5,999,652, Dec. 7, 1999, Plume or Combustion Detection by Time Sequence Differentiation of Images over a Selected Time Interval, Bushman, Boyd B., U.S. Pat. No. 5,798,942, Aug. 25, 1998 N-Best Feasible Hypotheses Multitarget Tracking System for Space-based early Warning Systems, Danchick, Roy, U.S. Pat. No. 5,793,889, Aug. 11, 1998, Plume or Combustion Detection by Time Sequence Differentiation, Bushman, Boyd B., U.S. Pat. No. 5,479,255, Dec. 26, 1995, Multispectral Signature Extraction Technique, m Denny, Joseph M., U.S. Pat. No. 5,464,174, Nov. 7, 1995, Air Defense System and Defense Missile for Such a System, Laures, Pierre, U.S. Pat. No. 5,451,014, Sep. 19, 1995, Self-initializing Internal Guidance System and Method for a Missile, Dare, James M., U.S. Pat. No. 5,430,448, Jul. 4, 1995, Object Detection System, Bushman, Boyd B.

As is know in the prior art, radiometers are passive devices, which rely on the natural black body or gray body electromagnetic radiation from a target to detect signals of thermal origin. Black body radiators are those radiators having an emissivity equal to unity while gray body radiators have an emissivity less than unity, but greater than zero. Generally, thermal emission, which is determined by absolute temperature and emissivity, is the dominant contribution to the natural radiation of the target. However, reflected and scattered radiation from other thermal emitters such the sun and the local terrain may also be a significant factor. Typically, radiometers are responsive to signals included in the range of one micron wavelength (1 mu) to one meter wavelength (1 m). However, signals in the optical ultraviolet or other regions of the electromagnetic spectrum are also of interest.

A variety of types of radiometers have been developed in the prior art. The most common type of microwave radiometer is a Dicke radiometer, which contains a radio frequency switch that selectively connects the radiometer receiver between an antenna and a reference load having a known absolute temperature. A multiplier synchronously switches the detector output to an integrator. The switching rate for the Dicke radiometer is selected to lie above the spectrum of receiver channel gain fluctuations with rates between 20 and 1,000 hertz being commonly employed. The continuous comparison of the antenna output with the matched load provides a modulation of the antenna input signal when a target signal is present while noise generated within the radiometer receiver remains unmodulated. However, switching necessarily degrades the theoretical sensitivity of a radiometer relative to total power performance. Furthermore, in the region of millimeter wavelengths, the development of a suitable switch having acceptably low insertion loss and sufficient isolation over a wide bandwidth is difficult to accomplish.

A need remains to reduce the clutter effects in detecting rocket launches in a battlefield environment. The present invention is intended to satisfy that need.

SUMMARY OF THE INVENTION

The present invention is a process for reducing background clutter by a minimum of two orders of magnitude in sources of high intrinsic radiance and high turbulence. This technique operates passively, at, great distances, and does not require a spatially resolved source on the detector. Rocket engines are objects of high intrinsic radiance that also posses high orders of turbulence in their plumes. We have developed a new technique of rapidly sampling a detection (rates of 10s of kilohertz), and examining the Fourier Transform of the emitted radiant energy in the power spectral density domain (Power per Herz as a function of frequency). In power spectral density space, the spectra of rocket plumes show two ubiquitous characteristics: a continuum that decreases as frequency increases (roughly 1/f, where f is frequency), and various resonances. The resonances are unique to the particular missile engine: organ pipe modes, mixtures of these, and pump frequencies. The 1/f like continuum does not yet have an adequate theoretical basis, but occurs in all missile plumes, and even to a lesser extent in all turbulent flows, such as a Bunsen burner or a propane torch. By sampling each detector array element at a very high rate, and performing a simple test for the presence of this 1/f like noise, background clutter is reduced by orders of magnitude and sensitivity is increased by the same amount. The unambiguous presence of a missile plume may be made by determining the upper frequency limit of the detected power spectral density, which is made from a simple curve fit to the data (determined from the entire data fit), and this same technique can be utilized to extract technical intelligence about the source. The measured reductions in background clutter and accompanying increase in sensitivity from the first field test are awe inspiring.

The present invention may be described as a process for identifying a missile in flight. This process comprising the steps of:

rapidly sampling radiometric detection signals of a source to collect power spectral density (PSD) characteristic that include the source's continuum in PSD space and PSD frequency; and identifying the source as a missile when the continuum in PSD space decreases as PSD frequency increases.

DETAILED DESCRIPTION OF THE PREFERRED EMBODIMENT

In view of the above, the present invention may be described as a method and system for providing a passive rocket launch detection capability. Its principles have broad application, and are described below.

Figure 1:
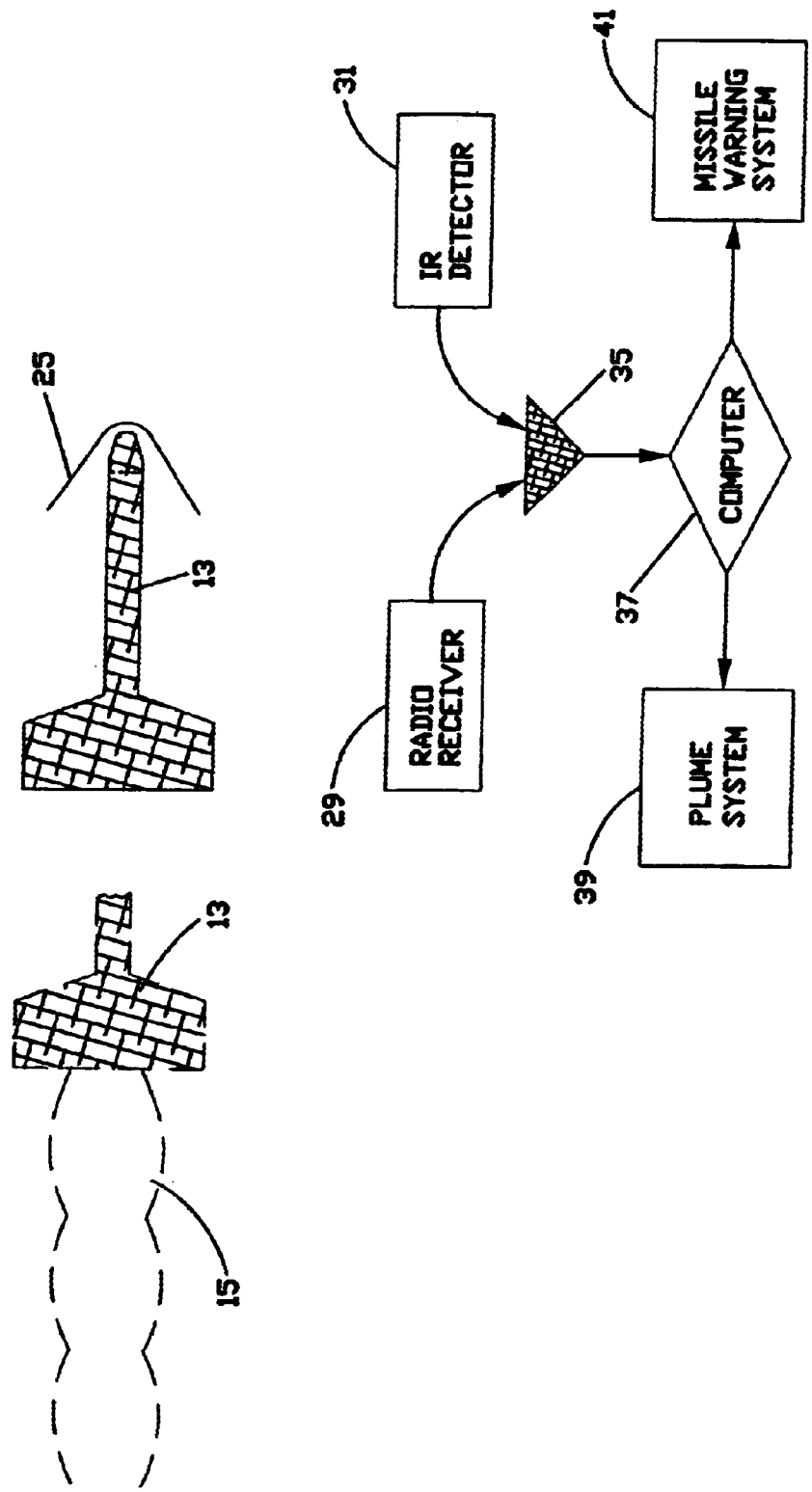
FIG. 1 is a missile detection system using the present invention.

FIG. 1 is an illustration of the application of the invention using a radiometric radio receiver 29, such as the Cohn Correlation Radiometer cited above, or infrared detector systems 31 to identify a rocket or missile 13 by the signature of its plume 15 as described below.

Detection signals from 29 and 31 are conveyed by interface 35 to the computer 37 that has a plume detection subroutine 39 that will distinguish sources and output a warning signal to the missile warning system 41 if a rocket is distinguished, as described below.

The present invention is a means of reducing background clutter by a minimum of two orders of magnitude in sources of high intrinsic radiance and high turbulence. This technique operates passively, at great distances, and does not require a spatially resolved source on the detector. Rocket engines are objects of high intrinsic radiance that also posses high orders of turbulence in their plumes. We have developed a new technique of rapidly sampling a detection (rates of 10s of kilohertz), and examining the Fourier Transform of the emitted radiant energy in the power spectral density domain (Power per Herz as a function of frequency). In power spectral density space, the spectra of rocket plumes show two ubiquitous characteristics: a continuum that decreases as frequency increases (roughly 1/f, where f is frequency), and various resonances. The resonances are unique to the particular missile engine: organ pipe modes, mixtures of these, and pump frequencies. The 1/f like continuum does not yet have an adequate theoretical basis, but occurs in all missile plumes, and even to a lesser extent in all turbulent flows, such as a Bunsen burner or a propane torch. By sampling each detector array element at a very high rate, and performing a simple test for the presence of this 1/f like noise, background clutter is reduced by orders of magnitude and sensitivity is increased by the same amount. The unambiguous presence of a missile plume may be made by determining the upper frequency limit of the detected power spectral density, which is made from a simple curve fit to the data (determined from the entire data fit), and this same technique can be utilized to extract technical intelligence about the source. The measured reductions in background clutter and accompanying increase in sensitivity from the first field test are awe inspiring.

Figure 2:
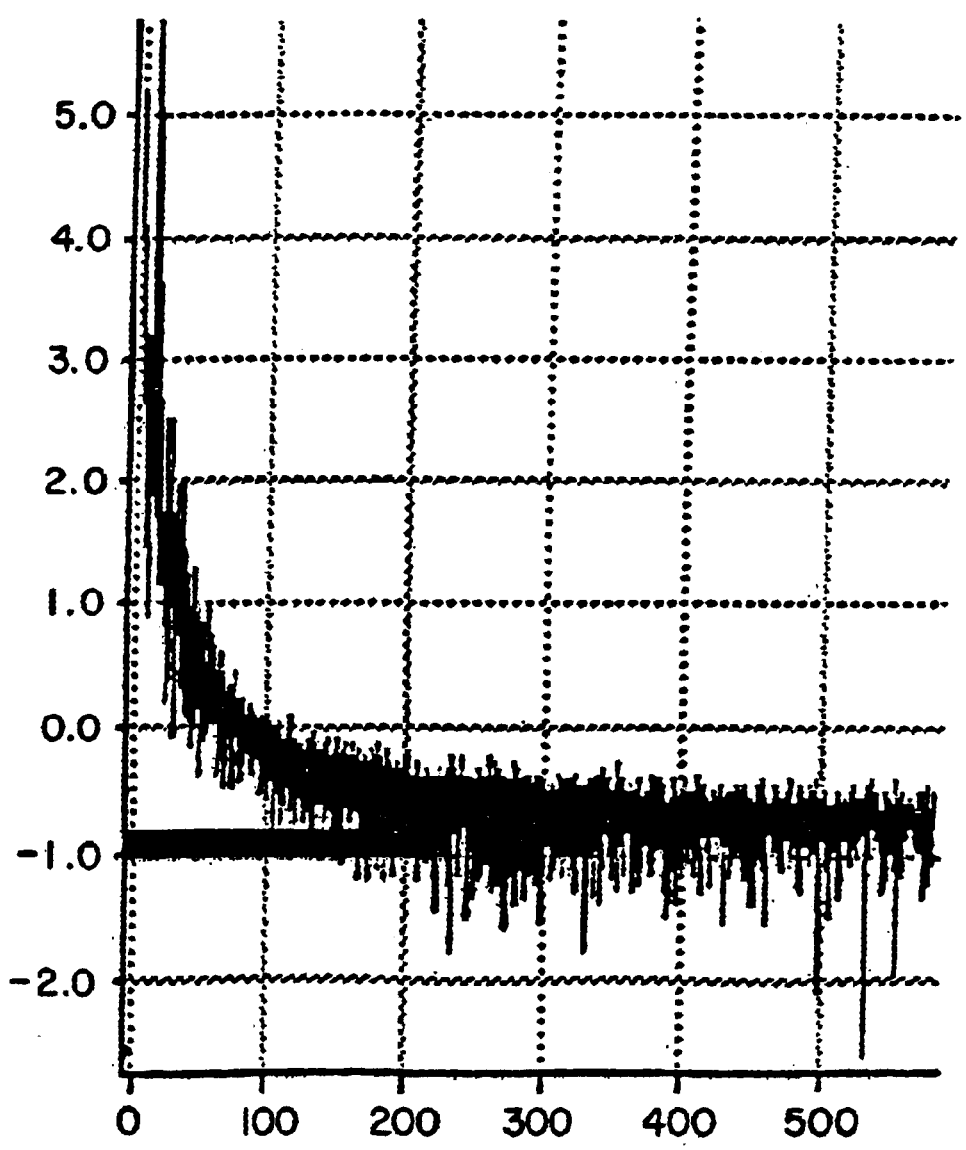
FIGS. 2, 3, and 4 are charts of the PSD signatures respectively of: a Bunsen burner, a propane torch, and an atlas missile.
Figure 3:
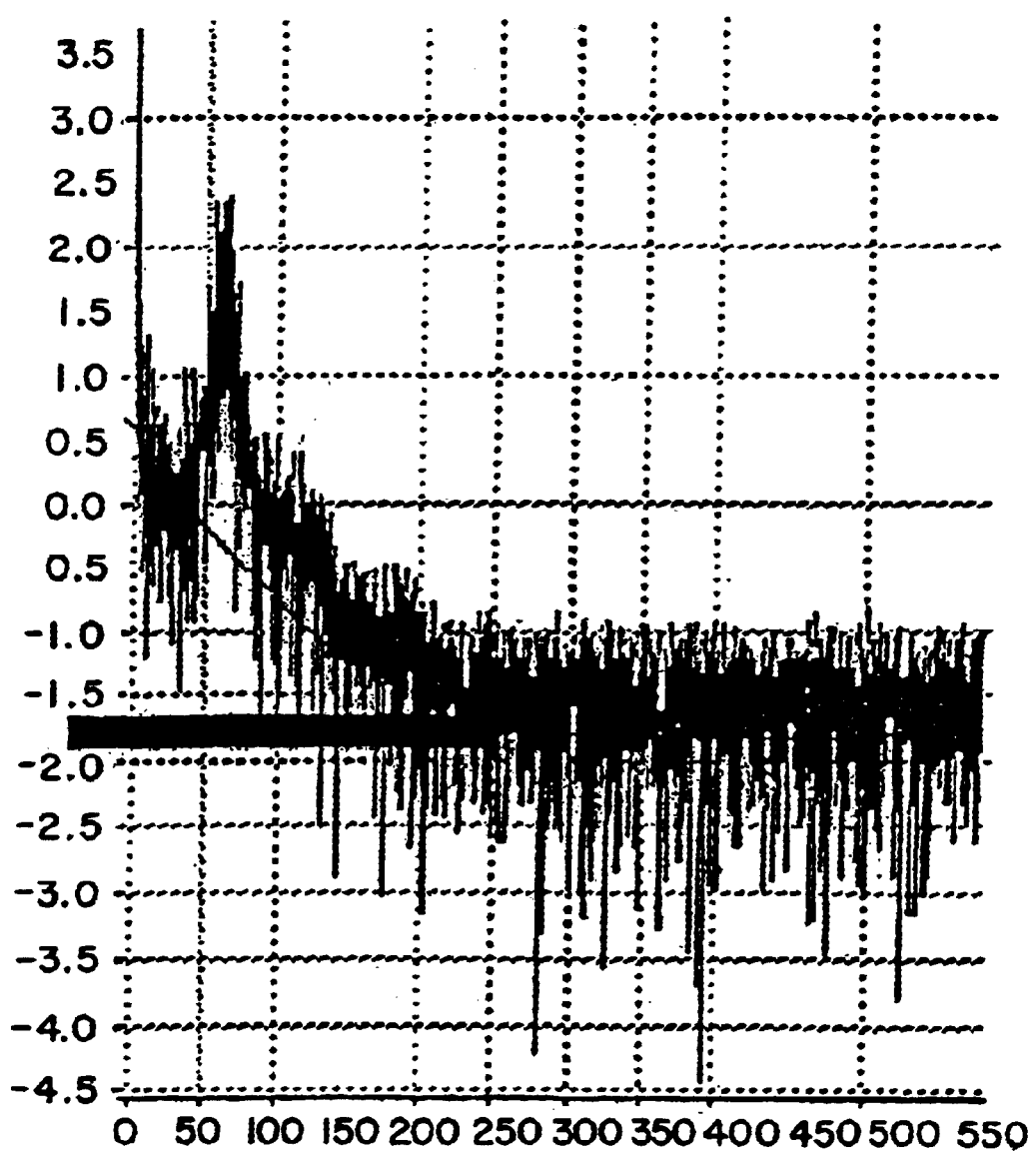
Figure 4:
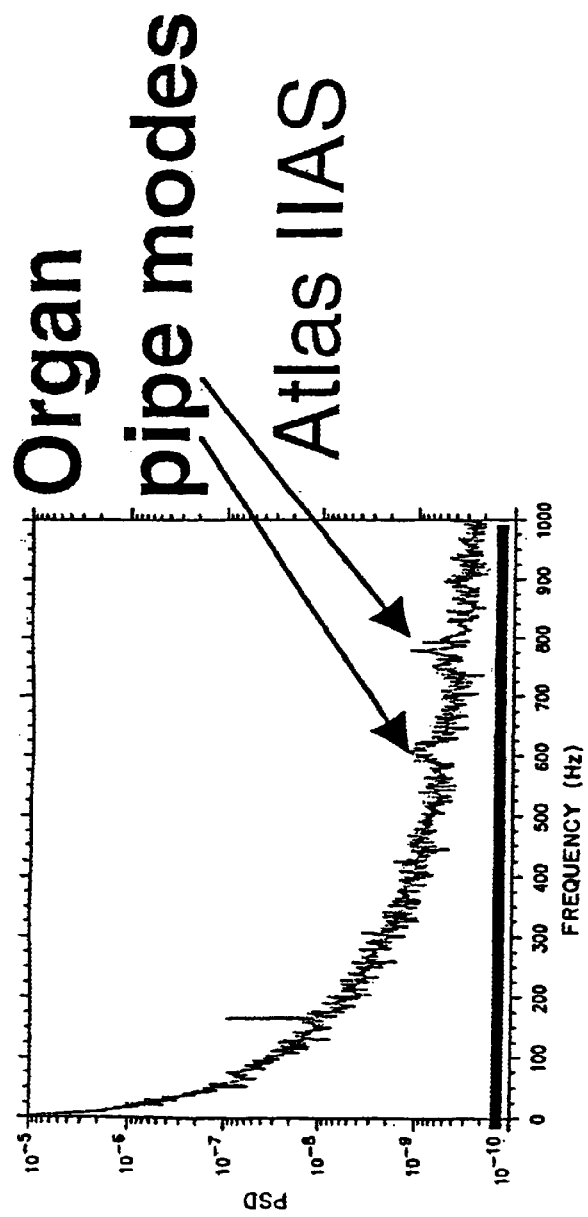
Figure 5:
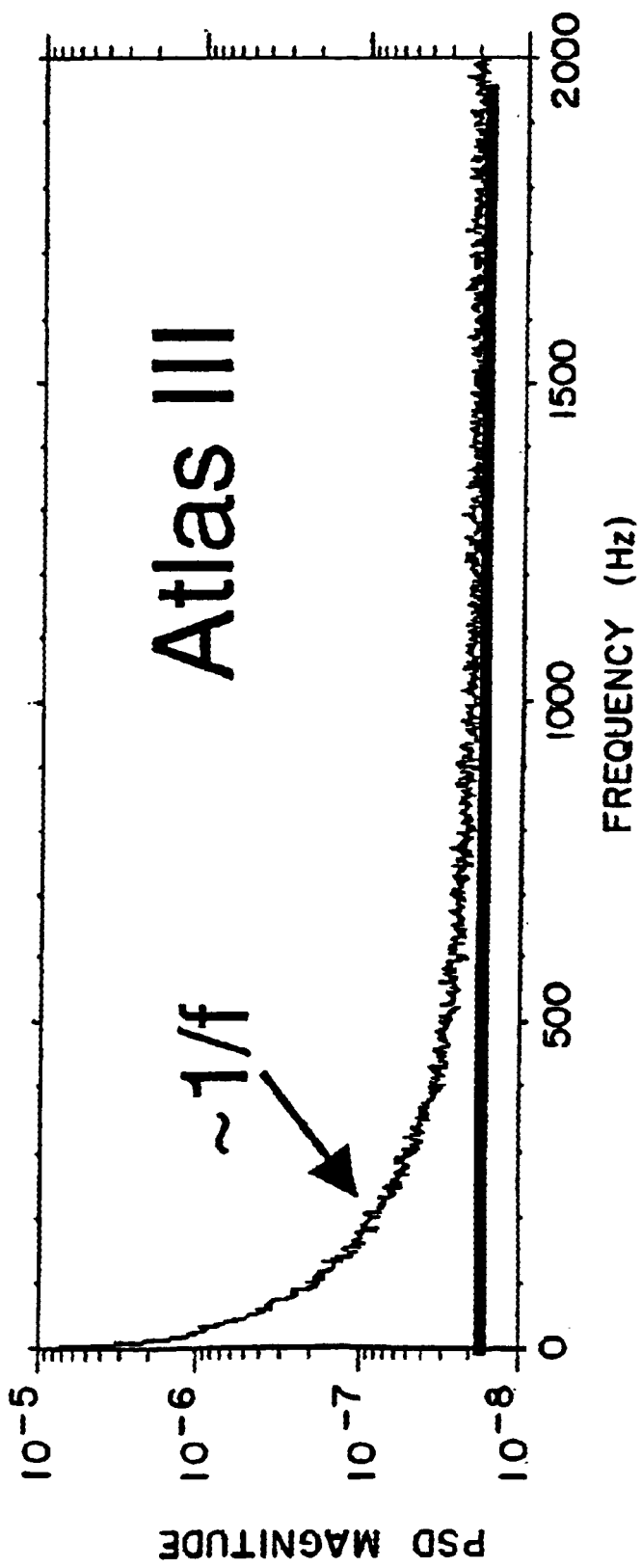
FIG. 5 is a chart of the PSD wavelength/frequency for a missile.

FIG. 1 is a missile detection system using the present invention;

FIGS. 2, 3, and 4 are charts of the PSD signatures respectively of: a Bunsen burner, a propane torch, and an atlas missile; and FIG. 5 is a chart of the PSD wavelength/frequency for a missile. Note how the missile plume exhibits both the 1/f characteristics described above and further has the organ pipe made fluctuations in its signature.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process for identifying a missile in flight, said process comprising the steps of:

rapidly sampling radiometric detection signals of a source to collect power spectral density (PSD) characteristics that include the source's continuum in PSD space and PSD frequency; and identifying said source as a missile when the continuum in PSD space decreases as PSD frequency increases.

* * * * *